United States Patent [19]
De Remigis

[11] 4,256,131
[45] Mar. 17, 1981

[54] FEEDBACK COLOR CONTROL SYSTEM

[75] Inventor: Joseph De Remigis, New Market, Canada

[73] Assignee: Sentrol Systems Ltd., Downsview, Canada

[21] Appl. No.: 940,566

[22] Filed: Sep. 8, 1978

Related U.S. Application Data

[63] Continuation of Ser. No. 704,992, Jul. 14, 1976, abandoned.

[51] Int. Cl.³ .................... G01N 21/30; G05D 11/13
[52] U.S. Cl. ........................................ 137/3; 137/93; 137/487.5; 356/405; 356/429; 162/198; 162/263
[58] Field of Search ............... 137/93, 3, 487.5; 222/DIG. 1; 250/226; 354/298; 356/405, 410, 411, 429; 364/526; 162/DIG. 10, DIG. 11, 263, 198; 8/7

[56] References Cited

U.S. PATENT DOCUMENTS

| | | | |
|---|---|---|---|
| 2,868,216 | 1/1959 | Robertson | 137/93 |
| 2,979,066 | 4/1961 | Christie | 356/410 |
| 3,389,265 | 6/1965 | Schreckendgust | 356/405 |
| 3,423,223 | 1/1969 | Schultze | 137/3 |
| 3,476,132 | 11/1969 | Gebel | 137/93 |
| 3,531,208 | 9/1970 | Ward | 364/526 |
| 3,555,262 | 1/1971 | Shimada | 364/526 |
| 3,601,589 | 8/1971 | McCarthy | 364/526 |
| 3,773,222 | 11/1973 | Fiebiger | 137/93 |
| 3,936,189 | 2/1976 | De Remigis | 250/226 |
| 3,945,729 | 3/1976 | Rosen | 250/226 |
| 3,981,684 | 9/1976 | Mavrovic | 137/93 |
| 3,992,100 | 11/1976 | Lodzinski et al. | 356/405 |
| 3,996,494 | 12/1976 | Suga | 250/226 |
| 4,003,660 | 1/1977 | Christie, Jr. et al. | 250/226 |
| 4,004,153 | 1/1977 | Obser et al. | 250/226 |
| 4,019,819 | 4/1977 | Lodzinski | 356/405 |
| 4,098,641 | 7/1978 | Casey et al. | 162/DIG. 11 |

OTHER PUBLICATIONS

John Pince, "The Chromaticity Diagram" Received, Jun. 28, 1956.
I.G.H. Ishak, "The Fibre Optics...", 1971, Oil & Color Chemists Assoc., Journal, vol. 54, No. 2, pp. 129-140.
M. Quinn, "Automatic Color Control on the Papermachine", 1968, Paper Technology Magazine, vol. 9, No. 4, pp. 317-321.
P. A. Buckley, "On-Machine Color Control", 1/1977, TAPPI Magazine, vol. 60, No. 1, pp. 147-149.
B. Machamer, "Major Break-Through...", 4/29/74, Paper Trade Journal, pp. 20-24.
E. L. Lewis, "Colorede:Color Measurement...", 7/20/64, American Dyestuff Reporter, pp. 30-34.

*Primary Examiner*—William R. Cline
*Assistant Examiner*—H. Jay Spiegel
*Attorney, Agent, or Firm*—Shenier & O'Connor

[57] ABSTRACT

In a feedback color control system for controlling the flows of two colorants used to color an article, a first error signal is generated as a function of deviations in the color saturation of the article from a desired saturation, and a second error signal is generated as a function of deviations in the hue of the article from a desired hue. The flows of the dyes are varied in the same sense in response to the first error signal and are varied in opposite senses in response to the second error signal.

14 Claims, 3 Drawing Figures

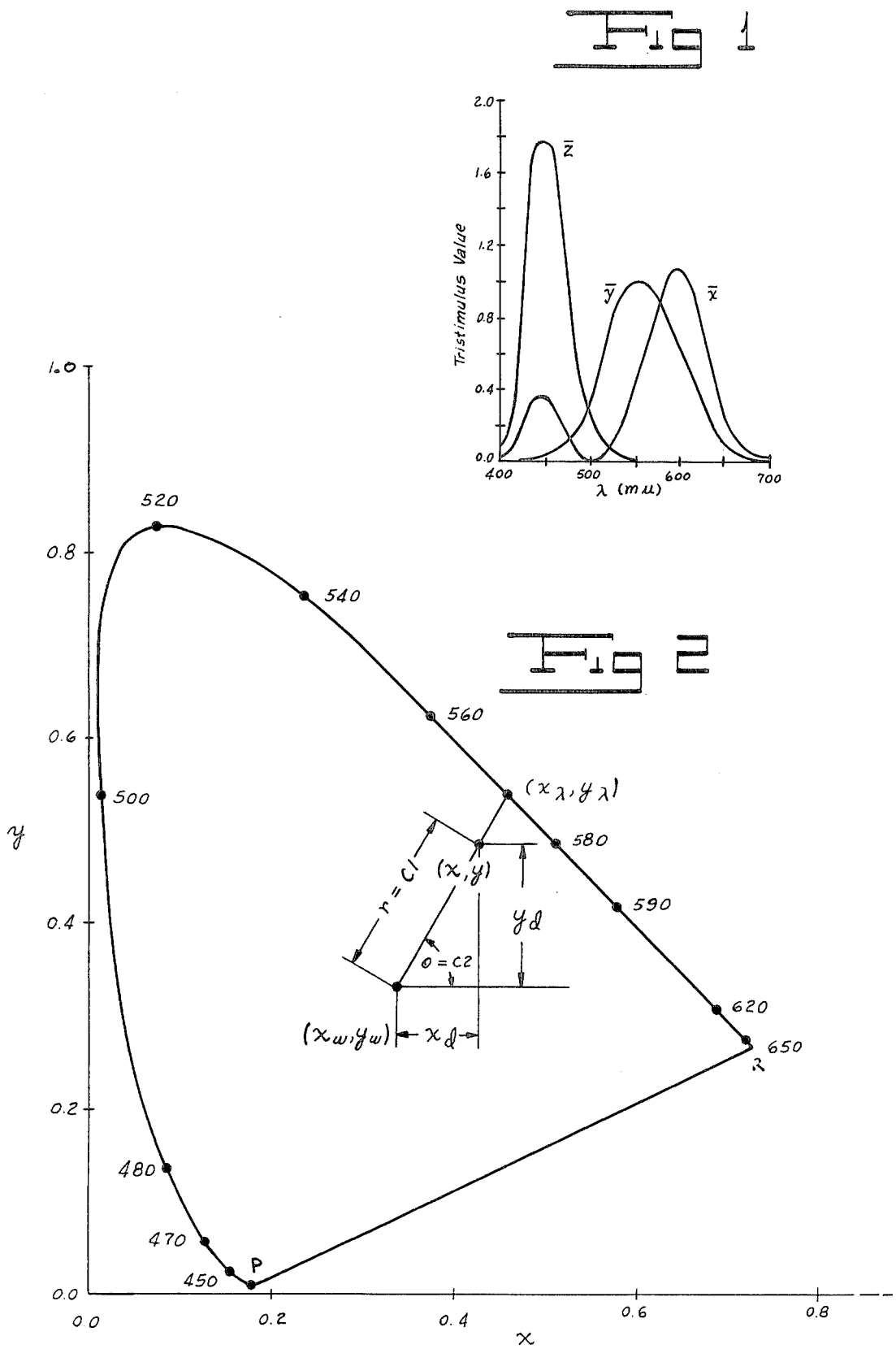

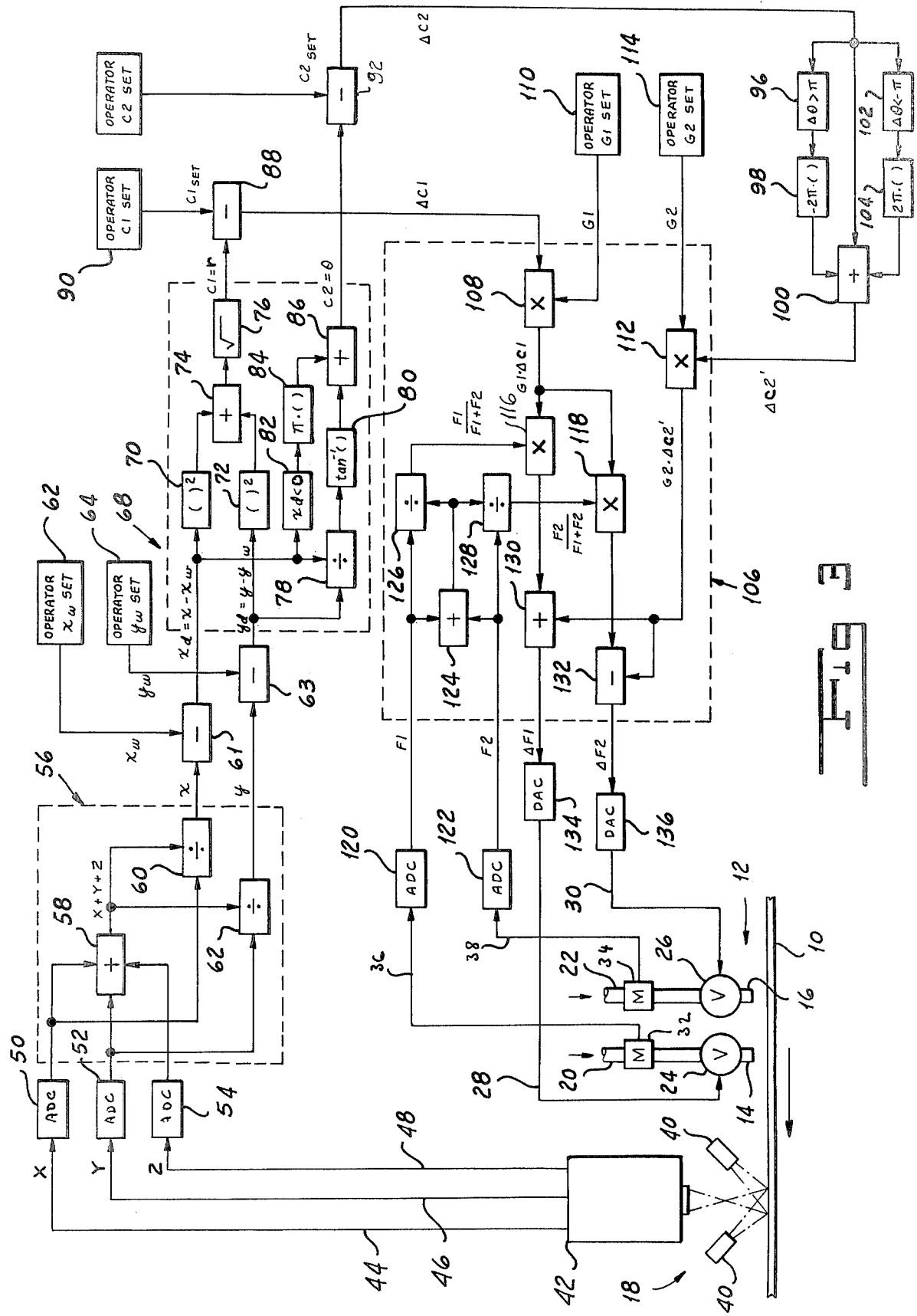

FEEDBACK COLOR CONTROL SYSTEM

This is a continuation of application Ser. No. 704,992, filed July 14, 1976 now abandoned.

BACKGROUND OF THE INVENTION

This invention relates to a feedback color control system and, more particularly, to a system for controlling the simultaneous application of two dyes to a continuously formed material such as a web of paper.

Continuous process color control systems are known in the prior art. Generally, such systems use tristimulus colorimeters or similar instruments to measure the tristimulus values (red, green, and blue primary components) of the light reflected from a portion of the web or other material. Each of the red, green, and blue tristimulus signals is used to provide negative feedback individually to control an appropriate dye applicator located upstream from the measuring point. An example of such a system is shown in U.S. Pat. No. 3,389,265, issued to Schreckendgust.

Systems such as that described above are not universally applicable to any two dyes. If an attempt is made to control addition of a single dye by using a measured tristimulus variable, the variable chosen for control must be changed depending on the dye used. Direct use of the measured tristimulus variable for control of the addition of two dyes has proved impracticable.

I have provided a feedback color control system which overcomes the defects of color control systems pointed out hereinabove. My system may be used without change for one or two dye control. It can be used for any combination of two dyes regardless of color. It does not require detailed information about the optical properties of the component dyes. My system utilizes optical properties which correlate extremely well with visual color assessment.

SUMMARY OF THE INVENTION

One of the objects of my invention is to provide a feedback color control system which provides satisfactory color control.

Another object of my invention is to provide a feedback color control in a system which uses only two dyes.

A further object of my invention is to provide a feedback color control system which may be used over a broad range of dye values without reprogramming.

Other and further objects of my invention will appear from the following description.

In general, my invention contemplates the provision of a system for controlling the flows of two dyes used to color material including means for providing a first signal as a function of deviations in the color saturation of the material from a desired saturation, means for providing a second signal as a function of deviations in the hue of the material from a desired hue, means responsive to the first signal for varying the flows of the dyes in the same sense, and means responsive to the second signal for varying the flows of the dyes in opposite senses.

In its broad aspect, my invention takes advantage of the fact that the hue of a dyed material generally depends on the ratio of the concentrations of the various dyes used and is relatively insensitive to the total dye concentration, while the color saturation of a dyed material generally depends on the total dye concentration and is relatively insensitive to ratio changes. More particularly, my control system compares the measured color saturation of the dyed material with a predetermined desired color saturation to obtain a first error signal, and compares the measured hue of the dyed material with a predetermined hue to obtain a second error signal. My system includes readily programmed means, to be described, for deriving the first or color saturation error signal and second or hue error signals over a wide range of dye choices. In response to the first error signal, the flows of the two dyes used are varied in the same sense to change the total dye concentration to a corrected value. Similarly, in response to the second error signal, the flows of the two dyes are varied in opposite senses to change the ratio of the dye concentrations to a corrected value. The above system allows the hue and color saturation of a dyed material to be controlled independently in a system using only two dyes, thus permitting a simplicity of construction not found in the prior art.

BRIEF DESCRIPTION OF THE DRAWINGS

FIG. 1 is a graph of the International Commission on Illumination primary components of the wavelengths forming the visible spectrum.

FIG. 2 is an International Commission on Illumination chromaticity diagram illustrating the principle of operation of my system.

FIG. 3 is a schematic diagram of the preferred embodiment of my color control system.

DETAILED DESCRIPTION OF THE PREFERRED EMBODIMENT

As is well known to those skilled in the art of colorimetry, the visual attributes of any light source may be characterized by expressing that light source as a linear combination of three primary light sources—that is, three light sources, no two of which can be combined to obtain the third. To facilitate the mathematical description of a light source in terms of such primary components, the International Commission on Illumination or ICI (also known by its French acronym CIE), has defined tristimulus values X, Y, and Z as follows:

(1) $X = \int f(\lambda)\bar{x}(\lambda)d\lambda$
(2) $Y = \int f(\lambda)\bar{y}(\lambda)d\lambda$
(3) $Z = \int f(\lambda)\bar{z}(\lambda)d\lambda$ where $f(\lambda)$ is the spectral energy density of the light source and $\bar{x}(\lambda)$, $\bar{y}(\lambda)$, and $\bar{z}(\lambda)$ are previously defined weighting functions corresponding to the respective "red", "green", and "blue" ICI primary components of the wavelengths of the visible spectrum. These weighting functions, plotted with respect to wavelength $\lambda$, are shown in FIG. 1. The X, Y, and Z tristimulus values thus obtained correspond generally to the red, green, and blue components of the light source. The primaries, however, have been given a physically unobtainable "purity" for ease of mathematical description.

To further facilitate the quantitative description of the color of a light source, which is insensitive to proportionate changes in the X, Y, and Z tristimulus values, the ICI has defined a pair of chromaticity coordinates x and y by the equations:

$$x = \frac{X}{X + Y + Z} \quad (4)$$

-continued
$$y = \frac{Y}{X+Y+Z} \quad (5)$$

The quantities x and y, which represent the fractional amount of the "red" and "green" primaries, respectively, are usually represented as the x and y coordinates of a standard x-y Cartesian coordinate plant commonly referred to as an ICI chromaticity diagram. FIG. 2 is such a diagram in which the spectrum locus, or locus of the chromaticity coordinates of pure spectral colors, is shown as a solid curved line RP. In FIG. 2, the pure "red" primary corresponds to the point (1,0), pure "green" to the point (0,1), and pure "blue" to the origin (0,0). "White" light, which is not precisely defined but implies an approximately equal mixture of red, green, and blue light, corresponds generally to the region around the point (1/3, 1/3). For the purposes of this disclosure, "white" light may be regarded as the light reflected from an undyed sample of the material being colored. As may be readily ascertained, additive mixtures of two light sources have x-y chromaticity representation that lies somewhere on the line segment joining the chromaticity points of the constituent light sources. The coordinate points R and P of the extremes (red and purple) of the visible spectrum have been joined by a solid straight line segment RP to form a closed curve whose border and interior region correspond to the set of physically realizable colors.

A more intuitive representation of a point (x, y) inside the spectrum locus may be obtained by drawing a line segment between the white light or source point $(x_w, y_w)$, as above defined, and the point (x, y) and extending the line segment past the point (x, y) to intersect the spectrum locus at a point $(x_\lambda, y_\lambda)$. The wavelength $\lambda$ corresponding to the point $(x_\lambda, y_\lambda)$ is defined as the dominant wavelength. The "excitation purity" b of the point (x, y) is defined as the ratio of the distance between $(x_w, y_w)$ and (x, y) to the distance between $(x_w, y_w)$ and $(x_\lambda, y_\lambda)$. Thus, a light source (x, y) having a dominant wavelength $\lambda$ and an excitation purity of b could be formed by combining b units of pure spectral light of wavelength $\lambda$ with (1-b) units of white light. The defined quantities of dominant wavelength and excitation purity correspond closely to the perceived hue and saturation of a light source. White light, for example, would have an undefined dominant wavelength and an excitation purity of zero. Pure spectral colors, on the other hand, would have an excitation purity of unity. All other colors have a dominant wavelength corresponding to some spectral wavelength (or some point on the red-purple line) and an excitation purity between zero and one.

It will be observed that the dominant wavelength of a light source (x, y) is a function only of the angular orientation $\theta$ of the point (x, y) relative to the source point $(x_w, y_w)$. In other words, all points lying on a given line extending from the source point will have the same dominant wavelength. It will also be observed that the excitation purity of a point (x, y) may be considered as being the product of the distance of the point (x, y) from the source point $(x_w, y_w)$ and the reciprocal of the distance of the dominant wavelength point $(x_\lambda, y_\lambda)$ from the source point $(x_w, y_w)$, the reciprocal being a slowly varying function of the dominant wavelength. From these relations it may be deduced that the color saturation of a light source (x, y) is generally determined by the distance of the point (x, y) from the source point $(x_w, y_w)$, and further that the hue of the light source (x, y) is generally determined by the angular orientation $\theta$ of the point (x, y) relative to the source point $(x_w, y_w)$. One aspect of my invention, therefore, contemplates means for generating the chromaticity coordinates x and y of a reflected light beam from the dyed material, means for measuring the distance of the point (x, y) from the source point $(x_w, y_w)$ to obtain a measured saturation signal, means for measuring the angular orientation of the point (x, y) relative to the source point $(x_w, y_w)$ to obtain a measured hue signal, and means for comparing said signals respectively with a first or color saturation reference signal and a second or hue reference signal to produce respective first and second error signals. Since this system is generally operable over all possible color choices, it is unnecessary to reprogram the system when different dyes are used or different setpoints are selected. System flexibility is thus significantly increased.

Referring now to FIG. 3, my system includes first and second dye applicators, located at a dyeing station indicated generally by the reference character 12. A sensing station, indicated generally by the reference character 18, is located downstream from the dyeing station 12. A moving web 10 of paper pulp or the like moves past the stations in the direction indicated by the arrow. Electrically operated valves 24 and 26 connect respective dye supply lines 20 and 22 to applicators 14 and 16. Valve 24 increases the flow of the first dye in response to a positive $\Delta F1$ signal on a line 28 and decreases the flow of the first dye in response to a negative $\Delta F1$ signal. Similarly, valve 26 increases the flow of the second dye in response to a positive $\Delta F2$ signal on a line 30 and decreases the flow of the second dye in response to a negative $\Delta F2$ signal. Preferably, each of the valves 24 and 26 changes the dye flow at a rate proportional to the input signal F1 $\Delta F2$ or F1, although this is not necessary where the valve actuating motors (not separately shown) are well damped. Flow meters 32 and 34 placed in respective dye lines 20 and 22 provide dye flow measurement signals F1 and F2 on lines 36 and 38.

At the sensing station 18, reference light sources 40 direct reference light beams on a portion of the paper web 10. The reflected light from this web portion is sensed by a tristimulus sensor 42 of any suitable type known in the art which produces X, Y, and Z signals representing, respectively, the red, green, and blue primary components of the reflected light beam. While the exact choice of primary colors used remains arbitrary, it is preferable for reasons of compatibility that the abovedefined primaries adopted by ICI be used. In a practical arrangement such as the one shown, the X, Y, and Z tristimulus values, may be derived by illuminating the sample with a standard light source having a prescribed spectral distribution, directing the reflected light through "red", "green", and "blue" filters having prescribed spectral responses, and measuring the light transmitted through the red, green, and blue filters. A detailed description of a tristimulus sensor capable of performing those steps is provided in my U.S. Pat. No. 3,936,189.

The analog X, Y, and Z tristimulus signals on lines 44, 46 and 48 are converted to digital form by respective analog-to-digital converters 50, 52 and 54 while the F1 and F2 flow measurement signals on lines 36 and 38 are changed to digital form by converters 120 and 122. Each of the remaining elements of my system to be described, unless otherwise stated, has a multibit parallel binary input and also has a multibit parallel binary output. While the input and output "lines" of these elements are shown as single conductors for clarity, it is to be understood that each such "line" actually comprises a plurality of conductors corresponding to the number of bits in the signal.

The digitalized signals X, Y, and Z from converters 50, 52 and 54 are fed to a chromaticity coordinate generator circuit indicated generally by the reference numberal 56. More particularly, a three-input parallel adder 58 supplied with the digitalized X, Y, and Z signals provides a sum signal $X+Y+Z$. This signal is fed to the divisor input of a first divider 60, the dividend input to which is the digitalized X signal to produce the x signal of Equation (4). The $X+Y+Z$ signal is also fed to the divisor input of a second divider 52, the dividend input to which is the digitalized Y signal to produce the y signal of Equation (5).

I feed the x chromaticity signal to a subtractor 61 which also receives an $x_w$ signal representing the x chromaticity coordinate of the reflected light from a "white" or undyed sample of the material 10. As is explained more fully in U.S. Pat. No. 3,936,189, the tristimulus colorimeter 42 includes means for normalizing the measured X, Y, and Z tristimulus values relative to the tristimulus values of the light sources 40. As a result, it is unnecessary independently to measure the tristimulus values of the reflected light from an undyed sample, and the value $x_w$ need only be determined when the system is initially calibrated for a given material 10. Thus, the $x_w$ signal is obtained from an operator-actuated parallel binary signal source 62. In other systems which do not have a self-standardizing colorimeter, it may be necessary for best results to continuously derive $x_w$ from an on-line sensor or colorimeter.

Similarly, the y chromaticity signal is fed to a subtractor 63 which also receives a $y_w$ signal, representing the y chromaticity coordinate of the reflected light from an undyed sample, from a second operator-actuated parallel binary signal source 64. Subtractors 61 and 63 provide difference signals $x_d$ and $y_d$ indicated in FIG. 2 and which represent the difference between the measured chromaticity signals x and y and the respective reference or "white" chromaticity signals $x_w$ and $y_w$.

Although it is desirable, from the standpoints of simplicity and standardization for monitoring or plotting, that the x and y chromaticity signals simply be the respective chromaticity coordinates, it is not essential to the practice of my invention. More generally, the chromaticity coordinate generator 56 may generate signals x' and y', where $x'=aX+bY/(X+Y+Z)$ and $y'=cX+dY/(X+Y+Z)$. By choosing appropriate coordinates x' and y', curves of equal "saturation" will appear on the x-y diagram as ellipses of various eccentricities and inclinations, rather than as circles. Such equal-saturation curves may be preferable in certain cases, depending on the particular operating point.

I apply the signals $x_d$ and $y_d$ to a polar coordinate generator indicated generally by the reference numeral 68 to obtain their polar coordinate equivalents. More particularly, the $x_d$ and $y_d$ signals are applied to respective squaring circuits 70 and 72, the outputs of which are fed to an adder 74. The adder 74 output is then fed to a square root extractor 76 to generate a Cl or r coordinate signal. I also apply the $x_d$ and $y_d$ signals to the dividend and divisor inputs, respectively, of a divider 78, the output of which is fed to an arc tangent generator 80 having an output range between $-\pi/2$ and $\pi/2$.

A sign indicator 82 responsive to the $x_d$ signal has an output of zero whenever the input is zero or positive and an output of one whenever the input is negative. I pass the output of the sign indicator 82 through a multiplier 84, which multiplies the input by $\pi$. I apply the output of multiplier 84 and the output of the arc tangent generator 80 to an adder 86 which provides a coordinate $\theta$ or C2 signal which ranges between $-\pi/2$ and $(3\pi)/2$.

The C1 or measured saturation signal is applied to a subtractor 88 as a first input. A $C1_{set}$ signal, derived from an operator-actuated parallel binary signal source 90 provides the second input for subtractor 88. Likewise, the C2 or measured hue signal is applied to a subtractor 92 as a first input. A $C2_{set}$ signal derived from an operator-actuated parallel binary signal source 94 provides the second input to subtractor 92. Subtractors 88 and 92 provide error signals $\Delta C1$ and $\Delta C2$ representing deviations in the saturation and hue of the sample being monitored.

Means are provided for transforming the hue error signal $\Delta C2$, which, assuming the signal generated by signal source 94 to range between $-\pi/2$ and $3\pi/2$, may represent any angle between $-2\pi$ and $2\pi$, into a modified hue error signal representing an angle between $-\pi$ and $\pi$. I feed the C2 signal to a first comparator 96 which produces a "one" output if C2 is greater than $\pi$. A multiplier 98 multiplies the output of comparator 98 by $-2\pi$ to provide one input to an adder 100. The $\Delta C2$ signal is also fed to a second comparator 102 which produces a "one" output if $\Delta C2$ is less than $-\pi$. A multiplier 104 multiplies the output of comparator 102 by $2\pi$ to provide a second input to the adder 100. A third input to the adder 100 is provided by the $\Delta C2$ signal directly. As is apparent from the above description, adder 100 provides a modified hue error signal $\Delta C2'$ ranging between $-\pi$ and $\pi$ and equal to $\Delta C2$ plus or minus some multiple of $2\pi$.

Error signals $\Delta C1$ and $\Delta C2'$ are fed to a circuit indicated generally by the reference character 106 which derives flow correction signals $\Delta F1$ and $\Delta F2$ to be applied to flow control lines 28 and 30. More specifically, I pass error signal $\Delta C1$ through a multiplier 108 which multiplies the signal $\Delta C1$ by a gain coefficient G1 derived from an operator-controlled parallel binary signal source 110. Likewise, hue error signal $\Delta C2'$ is passed through a multiplier 112 where it is multiplied by a second gain coefficient G2 derived from a second operator-controlled parallel binary signal source 114. The output of multiplier 108 is fed to one input of each of a pair of mutipliers 116 and 118 by feeding flow measurement signals F1 and F2 on lines 36 and 38 to respective analog-to-digital converters 120 and 122. Both digitalized signals are fed to an adder 124 and to the respective dividend inputs of dividers 124 and 128, each of the divisor input of which is the output of adder 124. The outputs of dividers 126 and 128, representing the respective fractional portions of the first and second dyes, are applied to the second inputs of multipliers 116 and 118. Multipliers 112 and 116 provide the inputs to adder 130 to produce the $\Delta F1$ flow control signal. Multipliers 118 and 112 provide the inputs to produce the $\Delta F2$ flow control signal. Finally, the $\Delta F1$ and $\Delta F2$ flow correction signals are passed to respective digital-to-analog converters 134 and 136 to provide analog signals on line 28 and 30 coupled to the respective control valves 24 and 26.

While the embodiment shown employs a special purpose digital circuit, it is to be understood that the signal processing functions of the system may also be performed by a suitably programmed general purpose computer in a manner familiar to those skilled in the art.

It will be seen that I have accomplished the objects of my invention. I have provided a feedback color control system which can be used for any combination of two dyes regardless of color. It can be used without change for one or two dye control. It utilizes optical properties which correlate extremely well with visual color assessment.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A system for controlling the flows of two preselected transparent colorants used to color a continuously formed material, comprising:
    means for providing a first signal as a substantially continuous function of measured color saturation of the material;
    means for providing a second signal as a substantially continuous function of measured hue of the material, said first and second signals defining a coordinate system in the x-y chromaticity plane in which lines of constant hue radiate outwardly from a predetermined chromaticity point and in which lines of constant saturation extend around said point;
    means responsive to said first signal for obtaining a first error signal representing deviations in said measured saturation from a desired saturation;
    means responsive to said second signal for obtaining a second error signal representing deviations in said measured hue from a desired hue;
    means responsive to the first error signal for varying in the same algebraic direction the magnitudes of the rates of flow of the colorants; and
    means responsive to the second error signal for varying in opposite algebraic directions the magnitudes of the rates of flow of the colorants.

2. A system as in claim 1 in which said colorants are dyes.

3. A system for controlling the flows of two preselected transparent colorants used to color a continuously formed material, comprising:
    means for providing a first signal as a substantially continuous function of measured color saturation of the material;
    means for providing a second signal as a substantially continuous function of measured hue of the material, said first and second signals defining a coordinate system in the x-y chromaticity plane in which lines of constant hue radiate outwardly from a predetermined chromaticity point and in which lines of constant saturation extend around said point;
    means responsive to said first signal for obtaining a first error signal representing deviations in said measured saturation from a desired saturation;
    means responsive to said second signal for obtaining a second error signal representing deviations in said measured hue from a desired hue;
    means responsive to the first error signal for varying in the same algebraic direction the magnitudes of the rates of flow of the colorants; and
    means responsive to the second error signal for varying in opposite algebraic directions the magnitudes of the rates of flow of the colorants while maintaining a constant total flow of said colorants.

4. A system for controlling the flows of two preselected transparent colorants used to color a continuously formed material, comprising:
    means for providing a first signal as a substantially continuous function of measured color saturation of the material;
    means for providing a second signal as a substantially continuous function of measured hue of the material, said first and second signals defining a coordinate system in the x-y chromaticity plane in which lines of constant hue radiate outwardly from a predetermined chromaticity point and in which lines of constant saturation extend around said point;
    means responsive to said first signal for obtaining a first error signal representing deviations in said measured saturation from a desired saturation;
    means responsive to said second signal for obtaining a second error signal representing deviations in said measured hue from a desired hue;
    means responsive to the first error signal for varying in the same algebraic direction the magnitudes of the rates of flow of the colorants while maintaining a constant ratio of flows of said colorants; and
    means responsive to the second error signal for varying in opposite algebraic directions the magnitudes of the rates of flow of the colorants.

5. A system for controlling the flows of two preselected transparent colorants used to color a continuously formed material, comprising:
    means for providing a first signal as a substantially continuous function of measured color saturation of the material;
    means for providing a second signal as a substantially continuous function of measured hue of the material, said first and second signals defining a coordinate system in the x-y chromaticity plane in which lines of constant hue radiate outwardly from a predetermined chromaticity point and which lines of constant saturation extend around said point;
    means responsive to said first signal for obtaining a first error signal representing deviations in said measured saturation from a desired saturation;
    means responsive to said second signal for obtaining a second error signal representing deviations in said measured hue from a desired hue;
    means responsive to the first error signal for varying in the same algebraic direction the magnitudes of the rates of flow of the colorants while maintaining a constant ratio of flows of said colorants; and
    means responsive to the second error signal for varying in opposite algebraic directions the magnitudes of the rates of flow of the colorants while maintaining a constant total flow of said colorants.

6. A system for controlling the flows of two preselected transparent colorants used to color a continuously formed material, comprising:

means for providing a first signal as a substantially continuous function of measured color saturation of the material, said saturation signal increasing as the chromaticity of the material varies in any direction away from a predetermined chromaticity and being constant along lines of chromaticity running around said predetermined chromaticity on a standard chromaticity diagram;

means for providing a second signal as a substantially continuous function of measured hue of the material, said hue signal increasing along said lines of constant saturation and being constant along lines of chromaticity running outwardly from said predetermined chromaticity;

means responsive to said first signal for obtaining a first error signal representing deviations in said measured saturation from a desired saturation;

means responsive to said second signal for obtaining a second error signal representing deviations in said measured hue from a desired hue;

means responsive to the first error signal for varying in the same algebraic direction the magnitudes of the rates of flow of the colorants; and means responsive to the second error signal for varying in opposite algebraic directions the magnitudes of the rates of flow of the colorants.

7. In a system in which first and second preselected transparent colorants are applied to a continuously formed material, apparatus for controlling the flows of said colorants to said material, comprising:

means responsive to a colored portion of said material for providing a first signal as a substantially continuous function of measured color saturation;

means responsive to a colored portion of said material for providing a second signal as a substantially continuous function of measured hue, said first and second signals defining a coordinate system in the x-y chromaticity plane in which lines of constant hue radiate outwardly from a predetermined chromaticity point and in which lines of constant saturation extend around said point;

means responsive to said first signal for obtaining a first error signal representing deviations in said measured saturation from a desired saturation;

means responsive to said second signal for obtaining a second error signal representing deviations in said measured hue from a desired hue;

means responsive to the first error signal for varying in the same algebraic direction the magnitudes of the rates of flow of the colorants; and means responsive to the second error signal for varying in opposite algebraic directions the magnitudes of the rates of flow of the colorants.

8. A system for controlling the respective rates of flow F1 and F2 of two preselected transparent colorants used to color a continuously formed material, comprising:

means for providing a first signal as a substantially continuous function of measured color saturation of the material;

means for providing a second signal as a substantially continuous function of measured hue of the material, said first and second signals defining a coordinate system in the x-y chromaticity plane in which lines of constant hue radiate outwardly from a predetermined chromaticity point and in which lines of constant saturation extend around said point;

means responsive to said first signal for obtaining a first error signal $\Delta C1$ representing deviations in said measured saturation from a desired saturation;

means responsive to said second signal for obtaining a second error signal $\Delta C2$ representing deviations in said measured hue from a desired hue; and means for generating flow correction signals $\Delta F1$ and $\Delta F2$ according to the formulas $$\Delta F1 = \frac{G1 \cdot \Delta C1}{(1 + \frac{F_2}{F_1})} + G2 \cdot \Delta C2$$

$$\Delta F2 = \frac{G1 \cdot \Delta C1}{(1 + \frac{F_1}{F_2})} - G2 \cdot \Delta C2$$

where G1 and G2 are predetermined coefficients.

9. A system for controlling the metering of two preselected colorants to a continuously formed material, comprising:

means for directing a reference light beam on a portion of said material;

means for obtaining the tristimulus values X, Y, and Z of the reflected light from said portion;

means for generating chromaticity coordinates x and y as a function of the proportionate strengths of said X, Y, and Z values;

means for generating difference coordinates $x_d$ and $y_d$ according to the formulas $$x_d = x - x_w$$

$$y_d = y - y_w$$

where $x_w$ and $y_w$ are predetermined coordinates;

means for generating the r and $\theta$ polar coordinates corresponding to said difference coordinates;

means for comparing said r and $\theta$ polar coordinates with preselected desired coordinates to generate respective first and second error signals;

means responsive to the first error signal for varying in the same algebraic direction the magnitudes of the rates of flow of the colorants; and means responsive to the second error signal for varying in opposite algebraic directions the magnitudes of the rates of flow of the colorants.

10. A system as in claim 9 in which said chromaticity coordinates x and y are generated according to the formulas $$x = \frac{a_1 X + b_1 Y}{X + Y + Z}$$

$$y = \frac{a_2 X + b_2 Y}{X + Y + Z}$$

where $a_1$, $a_2$, $b_1$ and $b_2$ are predetermined coefficients.

11. A system as in claim 10 in which $a_1 = b_2 = 1$ and $a_2 = b_1 = 0$.

12. A system as in claim 9 in which $x_w$ and $y_w$ are the chromaticity coordinates of light reflected from an uncolored portion of said material.

13. A method of controlling the flows of two preselected transparent colorants used to color a continuously formed material, comprising:

providing a first signal as a substantially continuous function of measured color saturation of the material;

providing a second signal as a substantially continuous function of measured hue of the material, said first and second signals defining a coordinate system in the x-y chromaticity plane in which lines of constant hue radiate outwardly from a predetermined chromaticity point and in which lines of constant saturation extend around said point;

obtaining a first error signal in response to said first signal representing deviations in said measured saturation from a desired saturation;

obtaining a second error signal in response to said second signal representing deviations in said measured hue from a desired hue;

varying in the same algebraic direction the magnitudes of the rates of flow of the colorants in response to the first error signal; and varying in opposite algebraic directions the magnitudes of the rates of flow of the colorants in response to the second error signal.

14. A method of controlling the metering of two colorants to a continuously formed material, comprising:

directing a reference light beam on a portion of said material;

obtaining the tristimulus values X, Y, and Z of the reflected light from said portion;

generating chromaticity coordinates x and y as a function of the proportionate strengths of said X, Y, and Z values;

generating difference coordinates $x_d$ and $y_d$ according to the formulas $$x_d = x - x_w$$

$$y_d = y - y_w$$

where $x_w$ and $y_w$ are predetermined coordinates;

generating the r and $\theta$ polar coordinates corresponding to said difference coordinates;

comparing said r and $\theta$ polar coordinates with preselected desired coordinates to generate respective first and second error signals;

varying in the same algebraic direction the magnitudes of the rates of flow of the colorants in response to the first error signal; and varying in opposite algebraic directions the magnitudes of the rates of flow of the colorants in response to the second error signal.

* * * * *